United States Patent Office 3,014,290
Patented Dec. 26, 1961

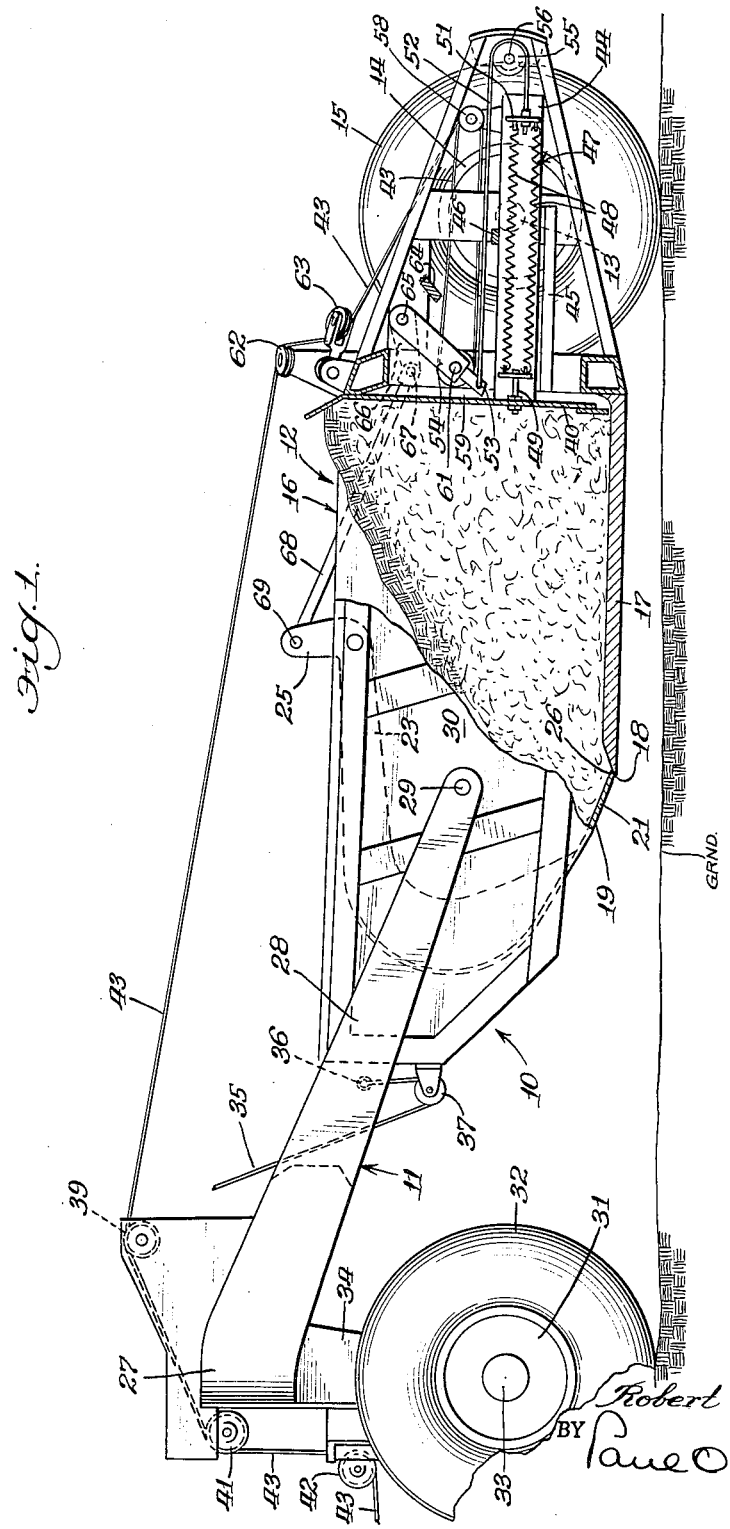

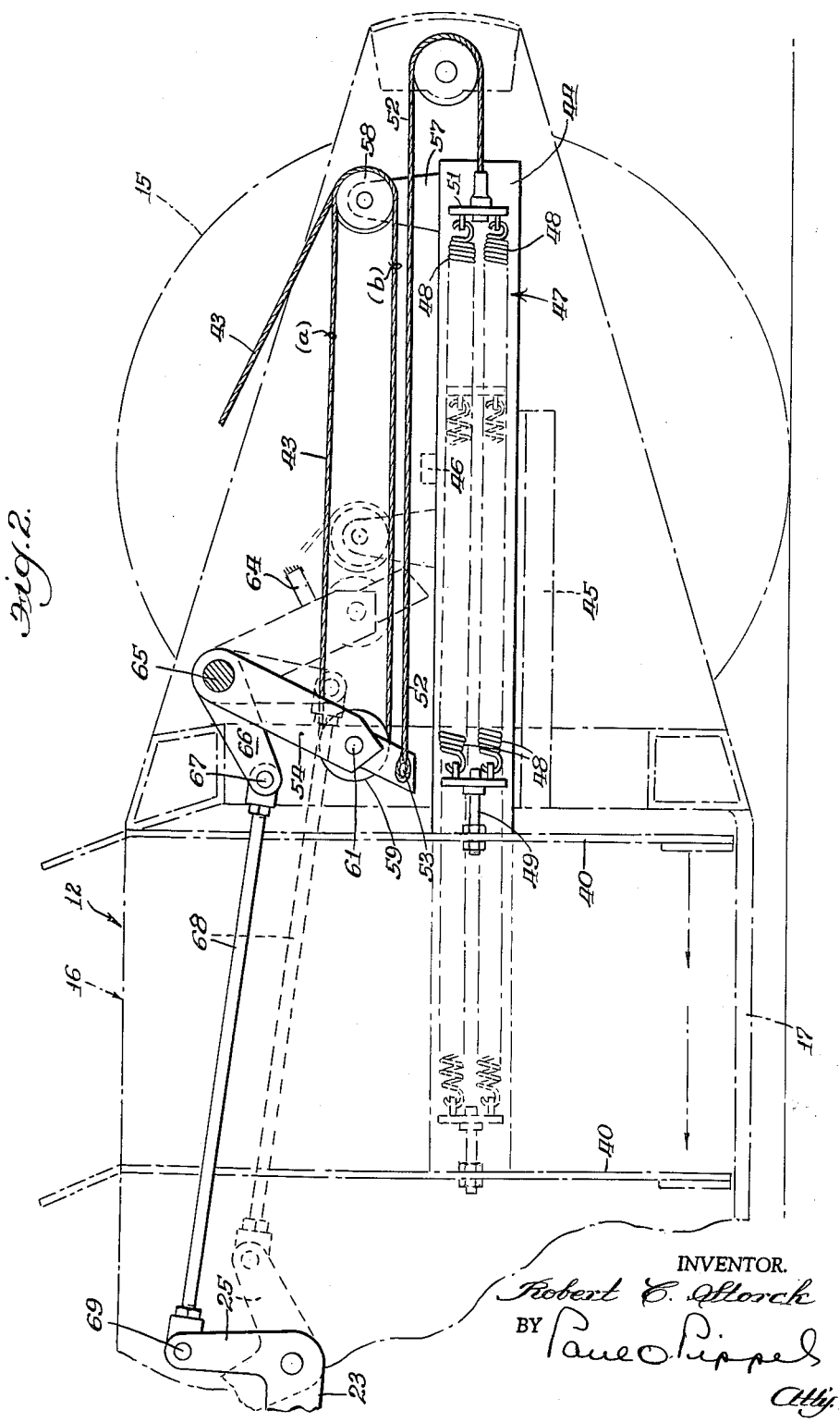

3,014,290
OPERATING MECHANISM FOR EJECTOR GATE AND APRON OF SELF LOADING SCRAPERS
Robert C. Storck, Glen Ellyn, Ill., assignor to International Harvester Company, Chicago, Ill., a corporation of New Jersey
Filed Nov. 17, 1958, Ser. No. 774,246
8 Claims. (Cl. 37—126)

This invention relates to self-loading scrapers of the character in which the load carrying bowl comprises a load-retaining apron and a load ejector gate, and more particularly concerns ejector gate return spring tensioning means for changing the tension in the spring pursuant to raising and lowering of the apron.

Self-loading scrapers conventionally comprise a cutting blade extending transversely across the bottom of the load carrying bowl. The forward portion of the bowl is known as an apron which has a lower rear edge portion adjustable forwardly and upwardly with respect to the cutting edge by pivotal movement of the apron. This adjustment provides an earth-receiving space between the lower rear edge of the apron and the scraper cutting edge and through which the earth sheared by the cutting edge is directed by the blade upwardly into the bowl. Earth thus directed into the bowl is carried partly upon the apron and partly upon the more rearward portion of the bowl rearward of the cutting edge. When it is desired to unload the scraper bowl, the apron is swung forwardly and upwardly to allow the portion of the load carried thereby to pour downwardly over its rear bottom edge and to facilitate that portion of the load carried by the bowl rearwardly of the cutting edge to spill forwardly over such cutting edge. Positive discharge of the load in the rear portion of the bowl is obtained by means of an ejector gate disposed in a rear portion of the bowl during filling and forcibly advanceable toward the bowl cutting edge to discharge the portion of the load rearwardly of the cutting edge and forwardly of the ejector gate over the cutting edge for being spread or otherwise dumped. This forward movement of the ejector gate in addition to being resisted by the load resting upon the bottom of the scraper is also resisted by the force of an ejector gate return spring of which the tension is increased by elongation of the spring attendant to forward projection of the ejector gate.

Conventional ejector gate return springs are large and costly, and, to enable them to be adequately extendable to enable the ejector gate to be moved forwardly the desired amount for completely ejecting the load, these springs must be relatively long, wherefore the space rearwardly of the ejector gate wherein the spring is enclosed requires rearward projection of the scraper frame a greater distance than desired.

An important object of this invention is the provision of an ejector gate return spring and control arrangement therefor making it possible to diminish the size and weight of the spring. This diminishes the cost of the spring and also diminishes the length and cost of the scraper frame which can be made shorter for accommodating the shorter spring.

Another object is the provision of an improved ejector gate return spring anchorage which is adjustable for modulating the amount of distortion of the spring pursuant to an advance and retractive excursive movement of the ejector gate. By thus controlling the magnitude of distortion of the spring, the magnitude of force exerted by the spring is also modulated so the maximum force exerted by the spring is diminished relative to that incurred in conventional springs with a fixed anchorage upon the scraper frame. This, of course, diminishes the spring force which must be resisted by the frame and likewise diminishes the spring force in opposition to advancive load-ejective movement of the ejector gate wherefore less energy is required for maneuvering the ejector gate for dumping the load from the bowl.

A further object is the provision of spring tension and anchorage control means operated under control of the apron lifting means, operable in such a fashion that when the apron is raised attendant to unloading of the scraper bowl, the spring anchorage is advanced to lessen the tension in the spring to correspondingly diminish the amount of force required for ejectively moving the ejector gate and to diminish the amount the spring is distorted attendant to ejection movement of the gate.

A further object is the provision of spring tension and spring anchorage control means according to the preceding object that is operable subsequent to unloading of the bowl and attendant to lowering of the apron to move the spring anchorage in the direction for retensioning the spring so the tension therein during retraction of the gate thereby is not dissipated prematurely to the return of the gate to its retracted position.

A further object of this invention is the provision of spring tension and spring anchorage control means connected between the spring and the bowl apron in a manner causing the force of the spring to exert a lifting force upon the apron and thus diminish the amount of control force necessary for lifting the apron.

Another object is the provision of an ejector gate and apron control means reactable against the ejector gate in a direction urging it advancively while reacting on the apron through apron operating means to raise the apron and diminish the force in the gate retracting spring attendant to energization of the said apron and ejector gate control means.

A further object is the provision of an ejector gate and apron control means according to the preceding object and which is of the cable species including sheaves respectively mounted on the ejector gate and the apron lifting means, between which sheaves there are a plurality of control line flights which diminishes the distance between the sheaves at a speed less than the linear speed of the control line, wherefore the control line can be adjusted a considerable linear distance by a winch or the like upon a scraper-towing tractor to incur a much diminished and accurate adjustment of the scraper bowl rear edge with respect to the cutting edge of the scraper blade to adjust the size of the opening through which scraped earth is directed into the scraper bowl.

Another object is the provision in a self loading scraper of an ejector gate and apron control means wherein there is an apron retraction spring reacting on a spring anchorage which is retractable to increase the force of such spring and a connection between the apron and the spring anchorage to retract such anchorage as the apron descends, whereby the spring resists descent of the apron to avoid destructive collision and impact of the apron with parts of the scraper blade or bowl attendant to desultory swinging of the apron pursuant to tilting of the scraper during vehicular travel thereof over irregular terrain while empty.

The above and other desirable objects inherent in and encompassed by the invention are elucidated in the ensuing specification, the appended claims and the annexed drawings, wherein:

FIG. 1 is a fragmentary side elevational view of a self-loading scraper with parts broken away and other parts shown in section to expose and illustrate components of a preferred embodiment of the present invention incorporated into such scraper.

FIG. 2 is an enlarged diagrammatic side elevational view of the rear portion of the scraper shown in FIG. 1 wherein certain components of the scraper and of the apron and ejector gate operating mechanism are shown enlarged and also shown by means of dotted lines in different operational positions.

With continued reference to the drawings, the self-loading scraper 10 in which the present invention is utilized comprises a draft frame 11, and a rear portion 12. The rear portion 12 of the scraper 10 has oppositely extending transverse axle shafts 13, one being shown by dotted lines in FIG. 1, suitably anchored upon respective opposite sides of the frame and each being supported within a wheel 14 upon which is mounted a rubber tire 15. This rear frame portion 12 includes a load receiving and carrying bowl 16 comprising a bottom 17 with a forwardly directed scraper cutting edge 18 extending transversely across the bowl, and a load-retaining apron 19 having a bottom portion 21 extending forwardly and upwardly with respect to the bowl bottom 17 to cooperate therewith in supporting a load of earth 22 or the like contained within the bowl. The apron 19 comprises C-shaped members 23 at respectively opposite sides of the bowl 16 that are pivotally connected by pins 24 with the rear frame portion 12 near upper edges of the bowl. Each of these apron members 23 has an upwardly extending arm 25 which when forcibly pivoted clockwise, as viewed in the drawings, causes the apron 19 to swing its bottom portion 21 forwardly and upwardly to separate a rear edge 26 thereof from the cutting edge 18. The apron edge 26 will be separated from the cutting edge 18 only a limited distance to form a narrow opening through which earth can be directed into the bowl when the latter is lowered to dispose the cutting edge 18 below the ground surface GRND while the scraper is towed forwardly. When it is desired to dump the bowl, the apron 19 is raised higher by pivoting the arms 25 to same position as that illustrated by dotted lines in FIG. 2.

The forward draft frame portion 11 is a U-shaped structure with a forward bight portion 27 having rearwardly extending legs 28 extending rearwardly from its opposite ends. Frame legs 28 are pivotally connected by pins 29 to opposite sides 30 of the bowl 16 that are rigidly upon the rear frame portion 12. This front frame portion 11 is supported upon front wheels 31 of the scraper that have inflated tires 32 and are at opposite ends of a front axle 33. A conventional king pin (not shown) projects upwardly from a center section of the axle 32 into a bearing 34 therefor on the front frame portion. Raising and lowering of the bowl 16 and its bottom cutting edge 18 is attained by a control line 35 having an end secured to an anchorage 36 mounted on the front frame between the legs 28 and passing beneath a sheave 37 journalled in a bracket 38 mounted on the front end of the bowl. Line 35 passes over sheaves (not shown), similar to sheaves 39, 41 and 42, for a second control line 43, to a tractor-mounted winch (not shown) which is operable to alternately wind in or pay out such line 35.

A load ejector gate 40 shown in full lines in its rearmost and retracted position within the bowl 16 has a rearward extending portion of spring-chamber stem 44 slidable fore and aft within a guide including a support rail 45 and a guide member 46. A spring or spring structure 47 comprises helical spring elements 48 constantly under tension and thus urging the gate retractively. The forward end of this spring 47 is connected to the gate by any connecting device 49, while the rear end of such spring is connected by a connecting device 51 and a cable 52 with spring anchorage means 53 mounted on the lower end of a pivotally-mounted arm 54. Cable 52 is trained about a sheave 55 rotatable upon a pin 56 fixed in the rear end of the frame portion 12.

The gate stem 44 has fixed thereto a bracket 57 for a multi-sheave unit 58 which is complemental with a multi-sheave unit 59 mounted on the lower end of the arm 54 by a bearing pin 61. Control line 43 leading from a tractor-mounted winch (not shown) over the sheaves 42, 41 and 39, passes about sheaves 62 and 63 to the rear sheave unit 58 and then forms several flights (a) and (b) between the multi-sheave units 58 and 59 before being anchored to the block of one of these units. Winding in of the control line 43 by the tractor-mounted winch shortens the flights (a) and (b) to first pull the sheave unit 59 rearwardly and to subsequently pull the sheave unit 58 forwardly. Rearward movement of the sheave unit 59 causes counterclockwise pivoting of the arm 54 an amount limited by an abutment stop 64 therefor on the frame portion 12. Arm 54 is constrained for rotation with a cross-shaft 65 journalled in opposite sides of the frame portion 12. Arms 66, one being shown in the drawings, are fixed to opposite end portions of the pivotal shaft 65, and these arms have respective pivot connections 67 with apron operating links 68 which have their forward ends pivotally connected at 69 with the arms 25 of the apron C-shaped members 23.

*Operation*

When the control line 43 is wound in upon the tractor-mounted winch, load is taken up in the flights (a) and (b) between the sheave units 58 and 59 for diminishing the distance between these units. Sheave unit 58 thus exerts a force forwardly upon the ejector gate extension 44 while the ejector gate 40 presses forwardly upon the bowl-contained load 22. Because of the frictional resistance of this load to sliding on the bottom of the bowl and hence to forward movement of the ejector gate, the sheave unit 58 will be held against forward movement while the unit 59 will be initially drawn rearwardly by the tightening control line to counterclockwise pivot the arm 54, shaft 65 and the arms 66 and thus pull rearwardly on the links 68 to commence raising of the apron 19. When the apron is fully raised, assuming the load 22 to be such that it and the spring can hold the ejector gate from advancing until this time, the arm 54 abuts the stop 64 so that additional shortening of the line flights (a) and (b) will commence to draw the sheave unit 58 and the ejector gate 40 forwardly for ejecting the load over the scraper cutting edge 18.

Since the spring 47 is under tension during the raising of the apron, the force of this spring acting through the cable 52 is exerted rearwardly on the arm 54 and the links 68 to supplement the force of the line 43 in raising the apron and diminish the winch-operating energy required to raise the apron. Also, since the tension spring 47 reacts rearwardly on the ejector gate 40 this force of the spring supplements the frictional adherence of the load on the bowl bottom in resisting forward or advance movement of the ejector gate during raising of the apron. However, as the apron raises and the spring anchorage 53 moves rearwardly, the spring tension normally decreases to a magnitude shortly before the arm 54 reaches the abutment 64 that the force of the line flights (a) and (b) on the sheave unit 58 is sufficient to begin advance of this sheave unit and of the ejector gate 40 and commence pushing part of the load 22 over the cutting edge 18. When the apron becomes fully elevated and the sheave unit 59 can retract no farther because of the stop 64, all of the take-up in the line flights (a) and (b) is used for advancing the sheave unit 58 forwardly so, if the control line continues to be wound in at constant speed, the ejector gate is accelerated at this time in its advancing dumping movement. The most advanced positions of the ejector gate and of the sheave unit 58 are shown by dotted lines in FIG. 2.

After the load has been dumped while the apron is raised, paying out of the control line 43 from the tractor-mounted winch will allow the spring 47 to contract attendant to retracting the ejector gate and the sheave unit 58 and lengthening the line flights (a) and (b) as the sheave unit 58 departs rearwardly from the sheave unit 59. The payed-out line is then taken up in lengthening flights (a) and (b). As the ejector gate retracts, the tension of spring 47 diminishes, and, when the gate retracts to about one-third of its travelling distance from its retracted or rearmost position the spring tension will diminish to the point that the force exerted thereby through the cable 52 onto the arm 54 will be substantially in balance with the gravitational force of the apron applied to such arm through the linkage 68, 66, 65, so that attendant to ensuing separation of the sheave units 58 and 59 the unit 59 will move forwardly as the unit 58 moves rearwardly at a diminished rate. This separation of the sheave units 59 and 58 will continue until the ejector gate is completely retracted, at which time the apron will be a short distance from the blade edge 18. The sheave unit 58 will then be fully retracted wherefore further pay-out of the control cable 43 from the tractor-mounted winch will incur only additional movement of the sheave unit 59, forwardly, to permit descent of the apron into complete closing relation with the blade edge 18, attendant to slight further tensioning of the spring 47.

It should be noted that the linkage 25, 68, 66, 65, 54, the sheave units 59 and 58 and the control line 43 including its flights (a) and (b) constitute connecting means connected between the apron 19 and the ejector gate 40 and energizable by the take-up of such line to forcibly react against each (the apron and the gate) attendant to raising the apron and advancing the gate. The anchorage 53 to which one end of the spring 47 is attached by the cable 52 is movable with the arm 54 of the aforesaid connecting means between the apron and the gate, wherefore this arm 54 constitutes spring control means operable in accordance with the operation of said connecting means to advance the spring anchorage means during energization of the connecting means; i.e., while the line flights (a) and (b) are being shortened by take-up of the line 43. Since the arm 54 swings in opposite directions according to whether the line flights (a) and (b) are being shortened or elongated, this arm constitutes means to advance and alternatively retract the spring anchorage means 53.

In the species herein illustrated when the sheave units 58 and 59 are drawn together by take-up of the control line 43, one force exerted by the line flights (a) and (b) tends to pivot the arm 54 rearwardly for raising the apron 19 while the equal and opposite force of these line flights tends to project the ejector gate for emptying the scraper bowl. As the control line and sheave units pivot the arm 54 and raise the apron, the spring anchorage 53 also moves rearwardly to lessen the tension of spring 47 so this spring offers less resistance to ensuing projection of the ejector gate. Therefore, by the time the arm 54 is pivoted to its advancive limit against the stop 64 when the line and sheave units are projecting the gate as the unit 58 is forced forwardly, this gate is opposed by a substantially diminished spring force.

Subsequent to ejector gate projection and when it is desired to retract the ejector gate, pay-out of the control line 43 from the winch to the sheave units 58 and 59 allows the apron to descend attendant to forward retractive swinging of the arm 54 to pull on cable 52 and increase the tension of spring 47 so it will have adequate force to retract the gate.

Therefore the present apparatus modulates the tension of the spring 47 so that diminished tension prevails to minimize its opposition to advance of the ejector gate while dumping, and so that increased tension prevails during gate retraction, to assure such retraction. The amount of linear expansion and contraction of the spring 47 is less because of its rear end being secured to an anchorage 53 movable in accordance with movement of the apron than if such anchored end of the spring was attached to a fixed anchorage. This connection of the spring provides a character of control therefor that requires less distention of the spring when the gate is projected to dump and correspondingly diminishes the amount of contraction of the spring that is necessary to retract the gate because of this retraction being supplemented by retraction of the spring anchorage 53. Since the amount of elongation and contraction of the spring is diminished, the necessary size, strength and weight are correspondingly diminished, whereby the spring is less costly and requires less space and a shorter spring chamber for its accommodation. This enables the entire scraper unit to be shortened to become maneuverable in a smaller area and to be of less weight and cost.

The vertical position of the apron 19 is determined by the extent of separation of the multi-sheave units 58 and 59 while the apron lower edge 26 is in proximity to the cutting edge 18 while loading, and considerable rotation of the tractor-mounted winch for the control line 43 is necessary to increase or decrease the length of the multi-flights (a) and (b) between the multi-sheave units. At times the width of the opening between the cutting edge 18 and the apron edge 26 is critical while loading. The considerable rotation necessary for the tractor-mounted winch to change the elevation of the apron edge makes it possible to make minute changes in and accurately control the width of the opening between the cutting edge 18 and the apron edge 26.

Having described a single preferred form of the invention with the view of clearly and concisely illustrating the same, I claim:

1. In a self-loading scraper, a load-carrying bowl including a load-retaining apron forming a forward portion thereof and liftable from a lowered load-retaining position to a load-dumping position, an ejector gate retractable into a rearward portion of the bowl and being advanceable forwardly from such rearward portion to discharge a load from the bowl when the apron is raised, a spring anchorage movable forwardly and rearwardly with respect to the ejector gate, an ejector gate return spring 47 connected between such gate and the anchorage, said spring being stressed attendant to advancement of the gate relatively to the anchorage to increase the force with which the spring retractively urges the gate, connecting means connected between the apron and the gate and energizable to forcibly react against each attendant to raising the apron and advancing the gate, and means for energizing said connecting means, such connecting means being subsequently operable to diminish its reactive force on the apron and gate to cause gravitational force from the apron to lower the same and to facilitate retraction of the gate by the force of the spring, said connecting means including control means operable in accordance with the operation of said connecting means to move the spring anchorage rearwardly during such energization of said means and thereby diminish the increase of stress in the spring during advancement of the gate, and operable pursuant to such subsequent operation of the apron and gate connecting means, to move the spring anchorage means forwardly and thereby diminsh the decrease of stress in the spring during retraction of the gate and correspondingly increase its effectiveness for retracting the gate.

2. In a self-loading scraper, a load-carrying bowl including a load-retaining apron forming a forward portion thereof and liftable from a lowered load-retaining position to a load-dumping position, an ejector gate retractable into a rearward portion of the bowl and being advanceable forwardly from such rearward portion to discharge a load from the bowl when the apron is raised, a spring anchorage movable forwardly and rearwardly with respect to the ejector gate, an ejector gate return spring connected between such gate and the anchorage, said spring being stressed attendant to advancement of the gate relatively to the anchorage to increase the force with which the spring retractively urges the gate, connecting means connected between the apron and the gate and energizable to forcibly react against each attendant to raising the apron and advancing the gate, and means for energizing said connecting means, such connecting means being subsequently operable to diminish its reactive force on the apron and gate to cause gravitational force from the apron to lower the same and to facilitate retraction of the gate by the force in the spring, said connecting means including spring control means movable attendant to such raising of the apron to move the spring anchorage rearwardly for diminishing the stress in the spring, and said spring control means being operable attendant to lowering of the apron to move the spring anchorage means forwardly and thereby increase the stress in the spring.

3. In a self-loading scraper, a load-carrying bowl including a load-retaining apron forming a forward portion thereof and liftable from a lowered load-retaining position to a load-dumping position, an ejector gate retractable into a rearward portion of the bowl and being advanceable forwardly from such rearward portion to discharge a load from the bowl when the apron is raised, a spring anchorage movable rearwardly and forwardly with respect to the ejector gate, an ejector gate return spring connected between such gate and the anchorage, said spring being stressed attendant to advancement of the gate relatively to the anchorage to increase the force with which the spring retractively urges the gate, connecting means connected between the apron and the gate and energizable to forcibly react against each for raising the apron and advancing the gate in such sequence that the apron commences to raise before the gate commences to advance when opposed by a load in the bowl, and means for energizing said connecting means, such connecting means being subsequently operable to diminish its reactive force on the apron and gate to cause gravitational force from the apron to lower the same and to facilitate retraction of the gate by the force in the spring, said connecting means including spring control means operable attendant to such raising of the apron to move the spring anchorage rearwardly for diminishing the stress in the spring, and said spring control means being operable attendant to lowering of the apron to move the spring anchorage forwardly and thereby increase the stress in the spring.

4. In a self-loading scraper, a load-carrying bowl including a load-retaining apron forming a forward portion thereof and liftable from a lowered load-retaining position to a load-dumping position, an ejector gate retractable into a rearward portion of the bowl and being advanceable forwardly from such rearward portion to discharge a load from the bowl when the apron is raised, a spring anchorage connected with the apron for movement therewith movable rearwardly and forwardly respectively according to whether the apron is raised or lowered, an ejector gate return spring connected between such gate and the anchorage and stressed to urge the gate retractively and the anchorage rearwardly, the stress in said spring being increased attendant to advancement of the gate relatively to the anchorage or attendant to forward movement of the anchorage relatively to the gate, and the stress of the spring being decreased attendant to retraction of the gate relatively to the anchorage or rearward movement of the anchorage relatively to the gate, connecting means connected between the apron and the gate and energizable for raising the apron and advancing the gate pursuant to forcibly reacting against each, and means connected to said connecting means for energizing the same whereby the spring anchorage which is moved rearwardly attendant to raising of the apron diminishes the stress of the spring opposing advancement of the gate.

5. The combination set forth in claim 4, wherein the means connecting the apron with the gate includes a linkage of such mechanical advantage that resistance of a load in the bowl to advancement of the gate causes such connecting means to commence lifting of the apron and consequently commences rearward movement of the spring anchorage means for diminishing the stress in the spring prior to advancement of the gate, and means for limiting raising of the apron so that continued operation of the connecting means subsequent to raising of the apron to this limit incurs advancement of the gate.

6. The combination set forth in claim 4, wherein the means connected between the apron and the gate is operable subsequent to having raised the apron and to having advanced the gate to diminish the reacting force thereof against each to a value that the force of the spring upon the gate dominates the connecting means force thereon and commences retraction of the gate and that gravitational force upon the apron also dominates the force of the connecting means thereon to commence lowering of the apron attendant to forward movement of the spring anchorage means and thus correspondingly diminish the amount of recovery necessary in the spring to retract the gate.

7. In a self-loading scraper, a load-carrying bowl including a load-retaining apron forming a forward portion thereof and liftable from a lowered load-retaining position to a load-dumping position, an ejector gate retractable into a rearward position of the bowl and being advanceable forwardly from such rearward position to discharge a load from the bowl when the apron is raised, a bowl supporting frame disposed rearwardly with reference to the bowl; means for raising the apron and for advancing the ejector gate including a strut projecting rearwardly from the gate, a rearward control sheave block mounted on the strut for advancive and retractive movement with such strut and the gate, a forward control sheave block paired with the strut-mounted block, sheave guide means disposed upon said frame and adapted to guide the forward block while facilitating movement thereof both forwardly and rearwardly, means connecting the forward block with the apron for raising the latter attendant to rearward movement of such block, and a control line reeved about the sheaves in said blocks; a sheave mounted in a rearward portion of said frame, an ejector gate return spring having an end attached to said gate and projecting rearwardly therefrom, a spring anchorage connected with the forward sheave block for fore and aft movement therewith, a spring anchorage line connected with the opposite end of the spring, such anchorage line extending rearwardly from the spring and about the frame-mounted sheave from which such anchorage line extends forwardly into connection with the spring anchorage to maintain a tension in the spring that urges the gate retractively, the control line being operable when taken up from the control sheaves to shorten the flights of such control line reeved about such sheaves and thus diminish the distance between the control sheave blocks, the apron being operable by virtue of gravitational pull thereon and through said connecting means thereof with the forward sheave block to exert a force resisting rearward movement of such block, the spring anchorage means being operable through the spring anchorage line while the gate is retracted and while such anchorage means and the forward control block are in a forward position and the apron lowered to create a stress in the spring resisting forward movement of the gate and the rear block with a force exceeding the the force exertable by the apron for resisting rearward movement of the forward block and the anchorage means wherefore during initial shortening of the control line flights the forward block will be displaced rearwardly to commence raising of the apron while the rearward block remains at rest, such rearward displacement of the forward block and hence of the spring anchorage being operable through the spring anchorage line to diminish the stress in the spring so that after some rearward movement of the forward block and concomitant partial raising of the apron the force of the spring resisting forward movement of the gate and rearward block becomes substantially equal to the gravitational force of the apron resisting rearward movement of the forward block wherefore the rearward block is moved forwardly by the control line while the forward block continues rearward by the take up action of such control line, and stop means subsequently stopping rearward movement of the forward block and of the spring anchorage wherefore continued take up of the control line only moves the rear block forward to advance the ejector gate attendant to extending the spring to increase the stress therein for effectively retracting the gate pursuant to subsequent feedback of the control line to the control sheaves.

8. The combination set forth in claim 7, wherein while the gate is fully advanced the spring is stressed to exert a force through the spring anchorage line to the spring anchorage of a magnitude to hold the forward sheave block against said stop means and thereby hold the apron raised, such force of the spring being also sufficient to rearwardly retract the gate and the rearward block to draw the control line back onto the control sheave attendant to said feedback of the control line thereto, and wherein the rearwardly retracting gate ultimately lessens the stress in said spring until the spring force is dominated by the gravitational force of the apron to advance the forward block and the spring anchorage forwardly during continued feedback of the control line to effect lowering of the apron, and such forward advance of the spring anchorage being effective through the spring anchorage line to preserve sufficient stress in the spring that the force thereof effectively completely retracts the gate.

References Cited in the file of this patent

UNITED STATES PATENTS

| | | |
|---|---|---|
| 2,445,053 | Allin | July 13, 1948 |
| 2,565,499 | Hyler | Aug. 28, 1951 |
| 2,846,788 | Vance | Aug. 12, 1958 |
| 2,852,870 | Kimsey et al. | Sept. 23, 1958 |